Sept. 5, 1967 W. J. HULSEY 3,340,023
CELLULAR STRUCTURE
Filed Sept. 21, 1964 3 Sheets-Sheet 1
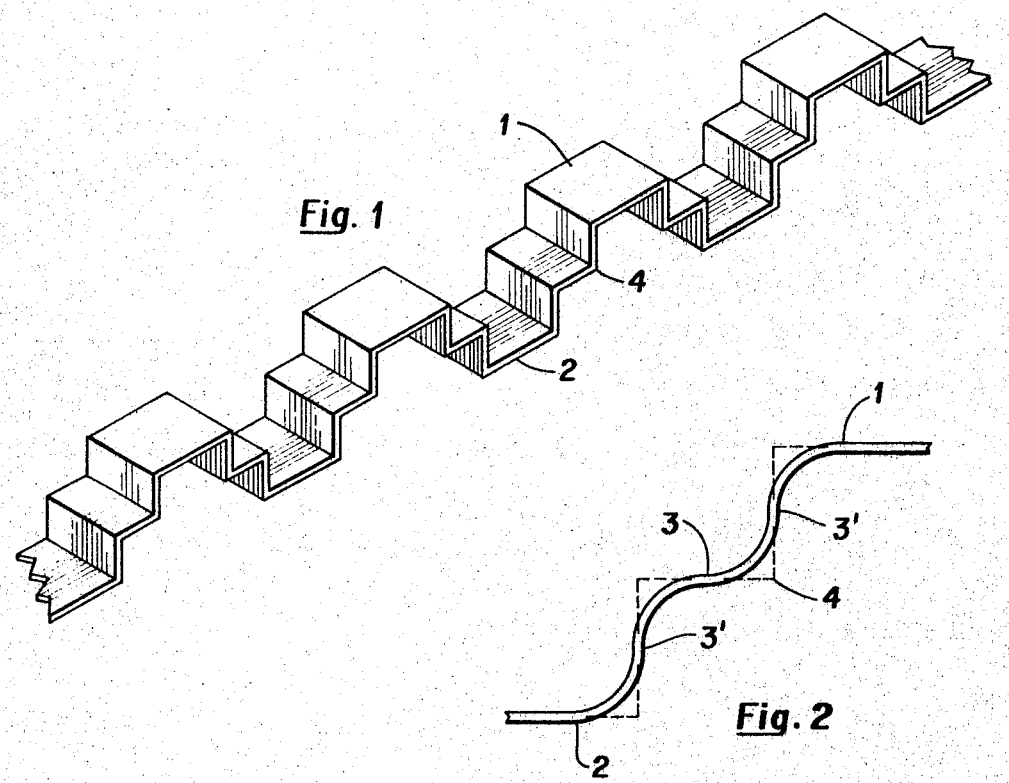
*Fig. 1*
*Fig. 2*
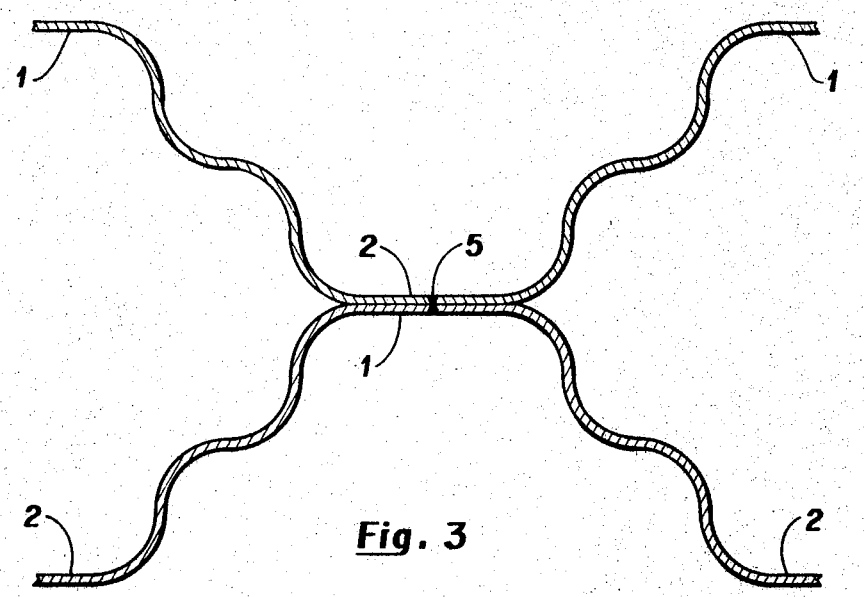
*Fig. 3*
INVENTOR.
William J. Hulsey
BY
ATTORNEY.

United States Patent Office 3,340,023
Patented Sept. 5, 1967

3,340,023
CELLULAR STRUCTURE
William J. Hulsey, Oak Ridge, Tenn., assignor to the United States of America as represented by the United States Atomic Energy Commission
Filed Sept. 21, 1964, Ser. No. 398,135
2 Claims. (Cl. 29—183)

This invention relates to honeycomb types of cellular cores or webs made from strip material, and more particularly to a honeycomb structure wherein the alternate ridges and grooves are joined by corrugations which permit permanent deformation of the structure into various desired shapes and configurations.

Heretofore, in the prior art it has been the practice to make structures of sheet material formed into a series of hexagonal configurations which are joined together to produce a honeycomb cellular core. See patents to Wright, 2,734,586; Runkle, 2,987,611; Rodman, 2,973,170. These hexagonal configurations lend rigidity to the structure and prevent deformation into desired shapes or configurations. However, since the honeycomb has the desirable characteristic of great strength per unit of weight, it has many useful applications such as for the wing structures and radomes for aircraft, and in the construction industry for ceiling domes and contoured partitions. When the relatively rigid hexagonal honeycomb core is employed, it must be tailored to the desired configuration as it is fabricated. This leads to custom fabrication for each application and fabrication and thereby contributes to high production costs.

Applicant with a knowdelge of these problems of the prior art has for an object of his invention the provision of a deformable cellular core which can be mass produced and which may be deformed into many desired structures.

Applicant has as another object of his invention the provision of a cellular core which is amenable to extensive forming into various configurations such as cylinders, paraboloids, spheres, etc.

Applicant has as a still further object of his invention the provision of a cellular core made of strip or ribbon material wherein the alternate ridges and valleys of the honeycomb are joined by at least one, but preferably a plurality of corrugations to impart deformability to the structure.

Other objects and advantages of my invention will appear from the following specification and the accompanying drawings, and the novel features thereof will be particularly pointed out in the annexed claims.

Figure 4:
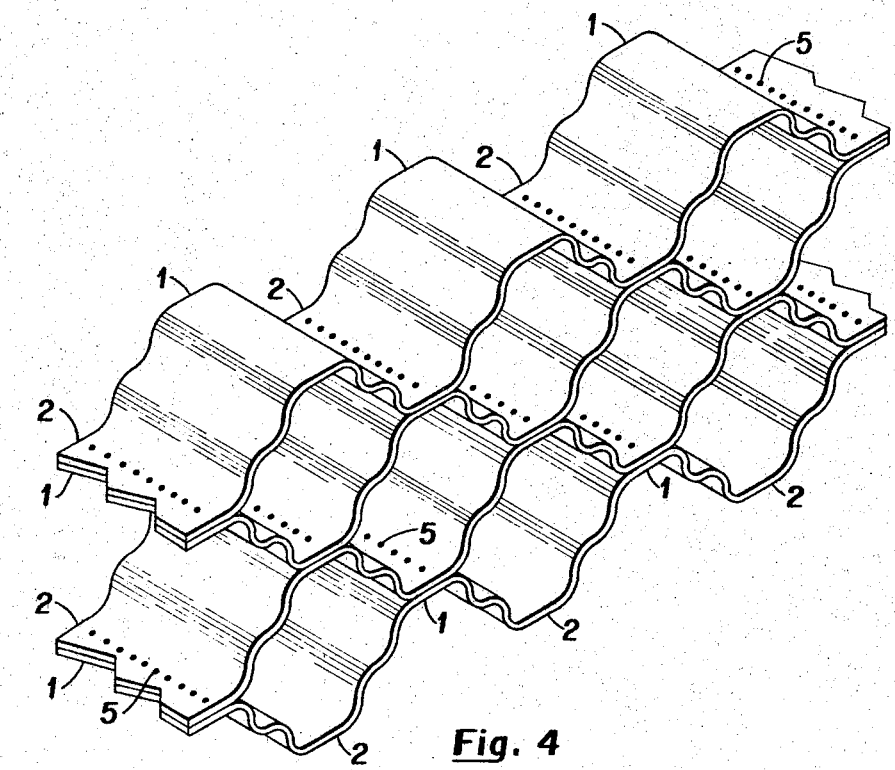
Figure 5:
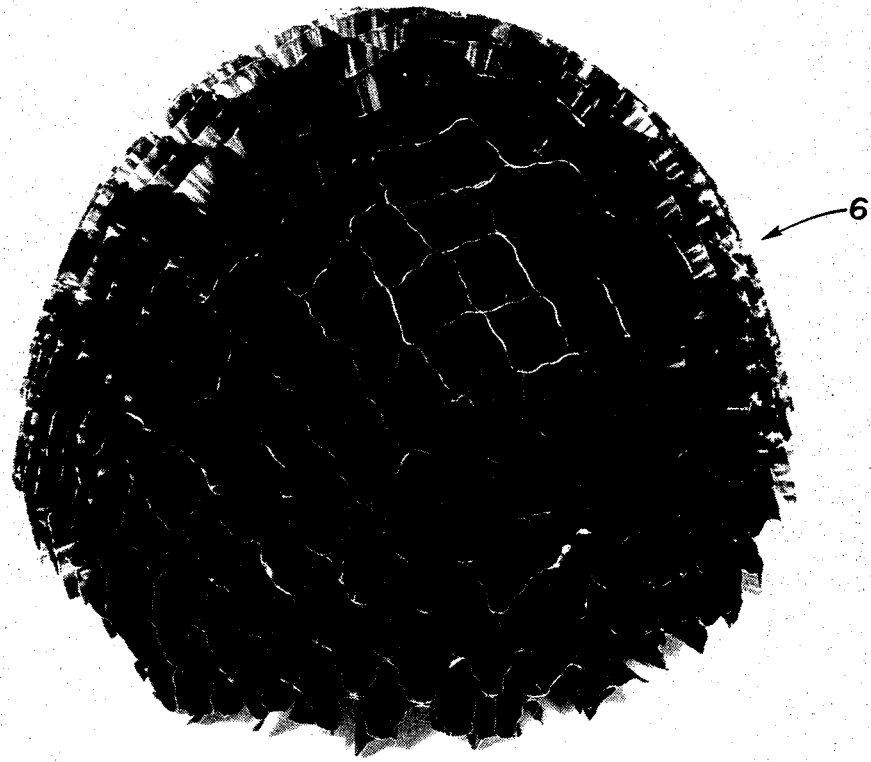

In the drawings, FIG. 1 is a perspective of an ideal component strip in slightly exaggerated configuration which may be used in fabricating a cellular structure. FIG. 2 is a side elevation of a portion of the same strip formed into the configuration used. FIG. 3 is an enlarged or exaggerated detail of a portion of two strips showing the manner of joining them. FIG. 4 is a perspective showing a portion of the built-up core structure. FIG. 5 is a perspective of a hemisphere formed from applicant's improved cellular structure.

Referring to the drawings in detail, FIG. 1 shows the ideal component strip made of metal such as aluminum or other suitable material, from which the cellular core is made, and best illustrates the construction. Here it is seen that the flat ridge portion 1 is joined to alternate flat valley portions 2 by strips that may be creased at 4, 4 to define two vertical sections 3', 3' joined by an intermediate horizontal section 3. In the ideal component strip of FIG. 1, for purposes of illustration only, the sections 3', 3' and 3 are bent along their crease lines 4 to form sharp corners. In practice, however, the corners are rounded, as shown in the solid lines of FIG. 2 to form deformable corrugations that join the ridge portions 1 to the valley portions 2. Corrugated component strips may be formed by machines of the general type shown in Runkle, 2,968,712 and Wentworth et al., 3,044,921 wherein the corrugating roller gears that mesh have appropriate contours to permit formation of corrugations of the desired configurations for joining the ridge and valley portions.

FIGS. 3 and 4 show the cellular core built up by mounting strips on each other in vertical stacked array so that the valley 2 of the upper component strip rests upon and is in alignment with the ridge 1 of the next lower component strip in the array. In this position the corresponding ridges and valleys of adjacent component strips are bonded together at 5 as by spot welding, or other suitable means. Of course, it will be understood that FIG. 3 is an enlarged and exaggerated detail for illustration only.

When assembled into an integral cellular core, the corrugations provide sufficient flexibility that the structure may be pressed over or into a die of the desired configuration and corrugations deformed so that the structure assumes the shape of the die, as shown at 6 in FIG. 5. Once formed in this manner, the structure will retain its shape and not be restored to its original cellular configuration. Thus, it is possible to use mass production techniques to form the cellular core into many different shapes and objects without sacrifice to strength and without building the cellular core structure to conform to the shape of a particular object in each instance.

Having thus described my invention, I claim:

1. A cellular core comprising a multiplicity of folded component strips joined in stacked array, each of said metal strips including alternate flat ridge and flat valley portions interconnected by wall portions each having at least one transversely extending corrugation, and means for integrally joining the corresponding ridge and valley portions of adjacent metal strips to form an integral structure.

2. A cellular structure comprising a multiplicity of folded metal strips joined together; each of said metal strips having alternating flattened ridge and groove portions; said alternating ridge and groove portions being interconnected by transversely corrugated wall portions; and the ridge and groove portions of each of said metal strips being integrally joined to the groove and ridge portions of adjacent metal strips respectively.

References Cited

UNITED STATES PATENTS

| 1,517,633 | 12/1924 | Junkers | 29—180 |
| 1,789,030 | 1/1931 | Balfe | 161—68 |
| 2,160,677 | 5/1939 | Romanoff | 29—180 |
| 2,644,777 | 7/1953 | Havens | 161—68 |
| 2,793,718 | 5/1957 | Pajak | 29—180 |

DAVID L. RECK, Primary Examiner.
RICHARD O. DEAN, Examiner.